United States Patent [19]
Schneider et al.

[11] Patent Number: 5,583,931
[45] Date of Patent: *Dec. 10, 1996

[54] COMBINATION TELEPHONE NETWORK INTERFACE AND COAXIAL CABLE APPARATUS AND COAXIAL CABLE MODULE

[75] Inventors: Pina Schneider, Holmdel; Eric J. Hermsen, Howell; Frank S. Siano, Spotswood; Avraham Tuvy, Oakhurst, all of N.J.

[73] Assignee: Antec Corp., Rolling Meadows, Ill.

[*] Notice: The term of this patent shall not extend beyond the expiration date of Pat. No. 5,394,466.

[21] Appl. No.: 502,770

[22] Filed: Jul. 14, 1995

Related U.S. Application Data

[63] Continuation-in-part of Ser. No. 300,417, Sep. 2, 1994, abandoned, which is a continuation-in-part of Ser. No. 18,327, Feb. 16, 1993, Pat. No. 5,394,466.

[51] Int. Cl.⁶ ................................................. H04M 11/00
[52] U.S. Cl. ........................... 379/399; 379/412; 348/8
[58] Field of Search ................................. 379/53, 90, 326, 379/397, 399, 412; 348/6, 7, 8, 10; 439/92, 498, 578, 579, 580, 581, 582, 583; 361/601, 602, 641, 823, 826, 827, 828

[56] References Cited

U.S. PATENT DOCUMENTS

| | | | |
|---|---|---|---|
| 3,610,810 | 10/1971 | Fribley, Jr. | 361/641 X |
| 3,760,130 | 9/1973 | Ross et al. | 361/641 X |
| 3,989,333 | 11/1976 | Cauldwell | 361/641 X |
| 4,133,021 | 1/1979 | King et al. | 361/660 |
| 4,266,266 | 5/1981 | Sanner | 361/643 |
| 4,578,702 | 3/1986 | Campbell, III | 348/6 X |
| 4,764,849 | 8/1988 | Khan | 361/641 X |
| 4,785,376 | 11/1988 | Dively | 361/641 X |
| 4,794,490 | 12/1988 | Epstein | 361/827 |
| 4,873,600 | 10/1989 | Vogele | 361/823 |
| 4,887,187 | 12/1989 | Nickola | 361/826 X |
| 4,912,615 | 3/1990 | Bluband | 361/827 |
| 4,945,559 | 7/1990 | Collins et al. | 379/399 |
| 4,949,376 | 8/1990 | Nieves et al. | 379/399 |
| 4,979,209 | 12/1990 | Collins et al. | 379/399 |
| 5,117,122 | 5/1992 | Hogarth et al. | 307/140 |
| 5,130,893 | 7/1992 | Straate et al. | 361/728 |
| 5,160,271 | 11/1992 | Franks, Jr. | 439/92 |
| 5,184,279 | 2/1993 | Horn | 361/641 |
| 5,196,988 | 3/1993 | Horn | 361/651 |
| 5,247,347 | 9/1993 | Litteral et al. | 348/14 X |
| 5,327,114 | 7/1994 | Straate et al. | 340/286.06 |
| 5,359,654 | 10/1994 | Jensen et al. | 379/399 X |
| 5,363,432 | 11/1994 | Martin et al. | 379/90 |
| 5,408,260 | 4/1995 | Arnon | 348/6 |
| 5,440,335 | 8/1995 | Beveridge | 348/13 |
| 5,469,495 | 11/1995 | Beveridge | 348/14 X |
| 5,515,435 | 5/1996 | DeBalko et al. | 379/399 |

OTHER PUBLICATIONS

Keptel Brochure, RVCT, CATV/Telephone Weatherproof Interface Unit, two pages duplexed; ©1989 Keptel, Inc.
Keptel Brochure, Cable Guard, OPE 9200, two pages duplexed, ©1994 Keptel, Inc.
Siecor Corp. CAC® 7750 Telephone Network Interface Installation For V5 West ©1993, 1994, One (1) page, copy attached.

*Primary Examiner*—Ahmad F. Matar
*Assistant Examiner*—Scott L. Weaver
*Attorney, Agent, or Firm*—R. Gale Rhodes, Jr.

[57] ABSTRACT

Combination apparatus for connecting one or more incoming telephone company lines to one or more telephone subscriber premises lines and for connecting incoming coaxial cable signals such as incoming cable television signals to a receiver of such signals such as a television set, and a coaxial cable module which may be embodied as a cable television module for being mounted to telephone network interface apparatus and for connecting incoming cable television signals to a television set.

26 Claims, 8 Drawing Sheets

COMBINATION TELEPHONE NETWORK INTERFACE AND COAXIAL CABLE APPARATUS AND COAXIAL CABLE MODULE

CROSS-REFERENCE TO RELATED APPLICATIONS

This application is a continuation-in-part of now abandoned U.S. patent application Ser. No. 08/300,417, filed Sep. 2, 1994, entitled COAXIAL CABLE MODULE AND COMBINATION COAXIAL CABLE MODULE AND TELEPHONE NETWORK INTERFACE, assigned to the same assignee as this application, which application Ser. No. 08/300,417 is a continuation-in-part of U.S. patent application Ser. No. 08/018,327, filed Feb. 16, 1993, entitled COMBINATION TELEPHONE NETWORK INTERFACE AND CABLE TELEVISION APPARATUS AND CABLE TELEVISION MODULE, assigned to the same assignee as this application and now U.S. Pat. No. 5,394,466, patented on Feb. 28, 1995. This application is also related in subject matter to now abandoned U.S. patent applications Ser. No. 08/266,188, filed Jun. 27, 1994, and Ser. No. 08/272,604, filed Jul. 11, 1994, entitled COMBINATION TELEPHONE NETWORK INTERFACE AND CABLE TELEVISION APPARATUS AND CABLE TELEVISION MODULE, both of which applications are assigned to the same assignee as this application.

BACKGROUND OF THE INVENTION

This invention relates to combination apparatus for connecting incoming telephone company wiring or lines to telephone subscriber premises wiring or lines and for connecting coaxial cable signals from a source thereof to a receiver thereof such as for example for connecting incoming cable television signals to a television set such as for example the television set of a telephone company subscriber or customer.

This invention further relates to a coaxial cable module for connecting coaxial cable signals from a source thereof to a receiver thereof and which may be embodied as a cable television module for being mounted, for example removably mounted, to telephone network interface apparatus through which one or more incoming telephone lines can be connected to one or more telephone subscriber's or telephone customer's telephones. The cable television module embodiment is for connecting incoming cable television signals to a television set, for example a television set belonging to one of the telephone company subscribers or customers.

As used hereinafter and in the appended claims, the term "coaxial cable signals" means any data, voice or video signal, such as for example and not by way of limitation, cable television signals, telephone signals, telegraph signals, video signals, and the like, capable of being carried or transmitted over a coaxial cable.

Numerous telephone network interface apparatus are known to the art for being mounted at a multiple dwelling such as an apartment house or condominium and which telephone network interface apparatus are for connecting one or more incoming telephone lines, typically a plurality of incoming telephone lines, to one or more telephone subscriber's or customer's telephones located at various apartments or condominiums comprising the multiple dwelling. Also known to the art are telephone network interface apparatus including one or more individual subscriber line modules, typically a plurality of such modules, with each individual subscriber line module for connecting one incoming telephone company line to one of the telephone customer's telephones. Such individual subscriber line modules, as known to the art, provide a demarcation point between a telephone subscriber's or customer's line and an incoming telephone line to facilitate the determination of whether a fault exists on the telephone customer or subscriber's line or the incoming telephone company line. Such telephone network interface apparatus and the individual subscriber line modules, as is also known to the art, are typically located in a common area, such as the basement of the apartment house or condominium, whereby a telephone repairman can make a ready determination of whether or not such fault exists on the telephone subscriber's line or the incoming telephone line whether the telephone subscriber or customer is home or not; such individual subscriber line module also permits the telephone customer or subscriber to make the determination of whether a fault exists on the telephone customer or subscriber's line or the incoming telephone company line. Examples of such telephone network interface apparatus and individual subscriber line modules are disclosed in U.S. Pat. No. 4,945,559, patented Jul. 31, 1990, entitled TELEPHONE NETWORK INTERFACE APPARATUS, and U.S. Pat. No. 4,979,209, patented Dec. 18, 1990 entitled INDIVIDUAL SUBSCRIBER LINE MODULE; Thomas J. Collins et al. are inventors of both patents and both patents are assigned to the same assignee as the present invention. These patents are incorporated herein by reference as if fully reproduced herein and U.S. Pat. No. 4,979,209 is referred to hereinafter as the "'209 patent."

With regard to one example of coaxial cable signals, cable television signals are typically transmitted to a multiple dwelling over an optical fiber line which terminates at an optical network unit typically located curbside to the above-noted multiple dwelling. Typically a plurality of coaxial cables run from the optical network unit to the above-noted individual apartments or condominiums to connect the incoming cable television signals directly, or through a cable television channel selector, to the individual television sets of the cable television customers residing in the apartments or condominiums. Should one of such television sets fail to provide a television picture and audio signals or sound, a question arises in the mind of the television customer as to whether the television set is not working or whether cable television signals are not being received. The television customer typically calls the cable television company and reports the failure and then arrangements must be made to coordinate the time at which a cable television repairman can come to the television customer's apartment or condominium with the time at which the television customer is home. This is particularly difficult due to the fact that cable television repairmen typically work 8:00 or 9:00 a.m. to 5:00 p.m., and television customers, including husbands and wives, typically also work 8:00 or 9:00 a.m. to 5:00 p.m.

Accordingly, and with further regard to the cable television signals example, there exists a need in the art for apparatus for interconnecting a television customer's television set to incoming cable television signals which provides a demarcation point between such television set and the source of such cable television signals to permit a cable television repairman to make a reasonable determination as to whether or not the failure of the television set to provide a television picture and sound is due to the television set not working or the failure to receive incoming cable television signals, and to permit such cable television repairman to make such determination while the television customer is not present at the apartment or condominium. Thus, it will be further understood, more broadly, there exists a need in the art for apparatus for interconnecting incoming coaxial cable signals to a receiver of such signals and for providing a demarcation point between the receiver and the source of such signals to permit a repairman to make a reasonable determination as to whether or not the failure of the receiver to respond to such signals is due to the failure of the receiver of such receiver to function or the failure to receive the incoming coaxial cable signals from the source.

There also exists a need in the art for apparatus providing such demarcation point which permits the user of the receiver of the coaxial cable signals to make a reasonable determination as to whether or not the failure of the receiver of such signals is due to the failure of the receiver to function or is due to the failure of the receiver to receive the incoming coaxial cable signals. By way of further example, there exists a need in the art for cable television apparatus providing such demarcation point and which permits the television customer to make a reasonable determination as to whether or not the failure of the television set to provide a television picture and sound is due to the television set not working or the failure to receive incoming cable television signals. If the determination indicates that the failure is due to the customer's television set not working, the customer has the television set repaired or replaced and avoids a service call from the cable television repairman and its needless attendant cost.

There further exists a need in the art for combination apparatus for connecting one or more incoming telephone company lines to one or more telephone subscribers' or customers' lines and for connecting coaxial cable signals from a source thereof to a receiver thereof, such as for example, for connecting incoming cable television signals to a cable television set which set may be, for example, the television set of a telephone subscriber or customer.

SUMMARY OF THE INVENTION

It is the object of the present invention to satisfy the foregoing needs in the art.

Combination apparatus satisfying the foregoing needs and embodying the present invention may include a housing to which are mounted telephone connecting apparatus for connecting at least one incoming telephone line with a telephone subscriber premises line and coaxial cable signal connecting means such as for example cable television connecting apparatus for connecting incoming cable television signals with a television set; the telephone connecting apparatus may provide a demarcation point to facilitate determination of whether a fault exists on the incoming telephone line or the subscriber premises line and the cable television connection apparatus, by way of example of one type of a coaxial cable module, may provide a demarcation point or points for facilitating determination of whether the failure of a television set to provide a picture and sound is due to the television set not working or is due to the failure to receive incoming cable television signals.

An example of coaxial cable module satisfying the foregoing needs and embodying the present invention is a cable television module mounted, e.g. removably, to the above-noted telephone network interface apparatus such as disclosed in the '209 patent and which module is for connecting a cable television customer's television set, which cable television customer may also be a telephone customer or subscriber, with incoming cable television signals. The module provides a demarcation point, or demarcation points, for permitting the cable television customer and/or a cable television repairman, to make a reasonable determination as to whether the failure of the television set to provide a television picture and audio signals or sound is due to the television set not working or the failure to receive incoming cable television signals. By mounting the cable television module to such telephone network interface apparatus, which apparatus as noted above is typically mounted in a common area such as the basement of an apartment house or condominium, the cable television repairman can have access to the demarcation point for making the above-noted determinations whether the television customer is at home or not.

DESCRIPTION OF THE PREFERRED EMBODIMENTS

Figure 1:
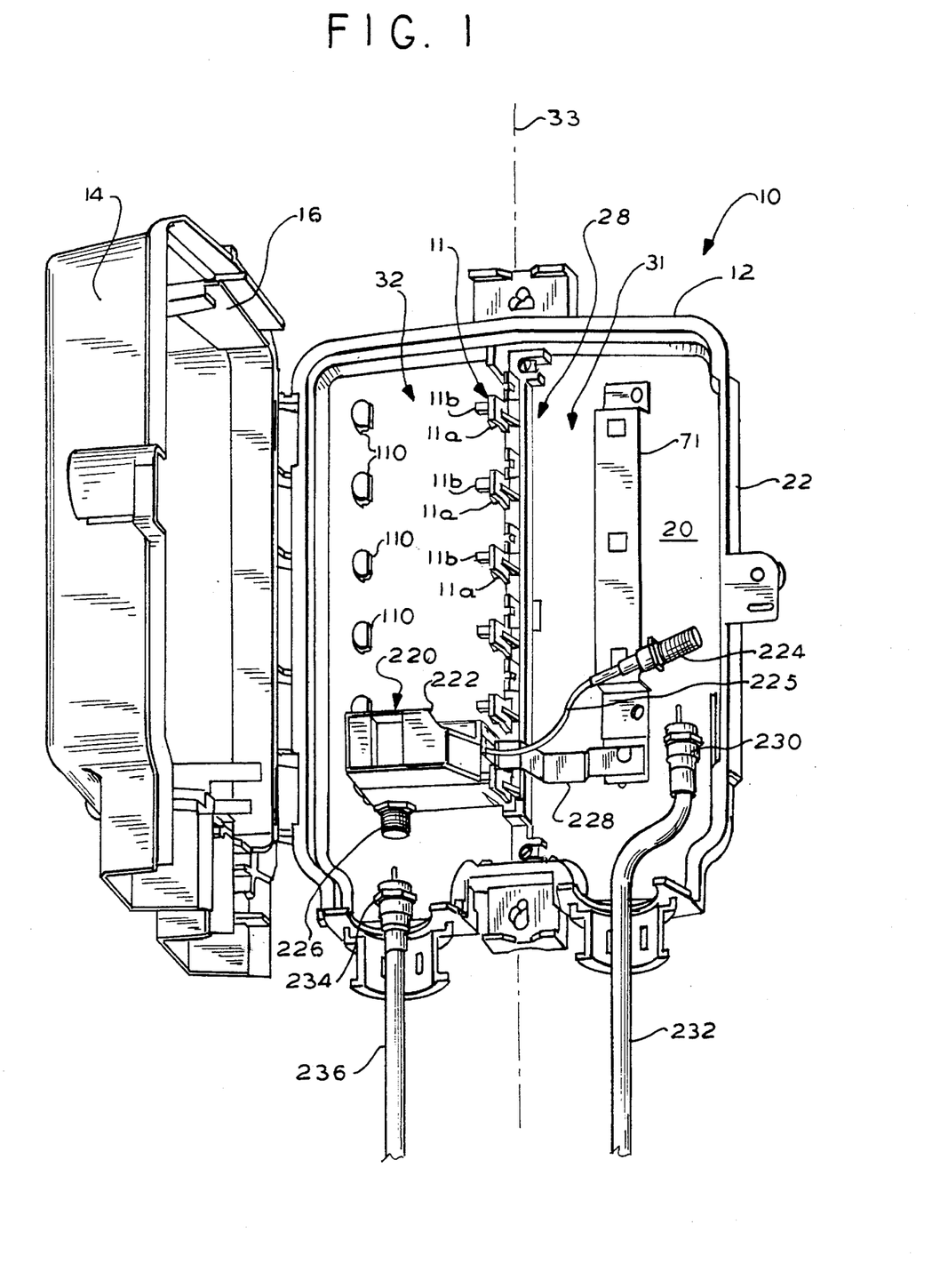
FIG. 1 is a front perspective view of a coaxial cable module of the present invention shown embodied as a cable television module mounted to telephone network interface apparatus substantially the same as that disclosed in the '209 patent.

Referring to FIG. 1, it will be understood that the telephone network interface apparatus indicated by general numerical designation 10 is substantially the same as the telephone network interface apparatus disclosed in the '209 patent and also indicated by general numerical designation 10. Telephone network interface apparatus of FIG. 1 differs from that of the '209 patent in that it includes an upwardly extending module mounting or retaining member indicated by general numerical designation 11. For convenience of reference, the structural elements of the telephone network apparatus 10 of FIG. 1 corresponding to the same structural elements of the telephone network interface apparatus disclosed in the '209 patent have been given the same numerical designations as in the '209 patent and, although the '209 patent has been incorporated herein by reference, for convenience of reference a brief description of the primary structural elements of the telephone network interface apparatus 10 will be presented as well as a brief explanation of the functions of such primary structural elements.

Figure 6:
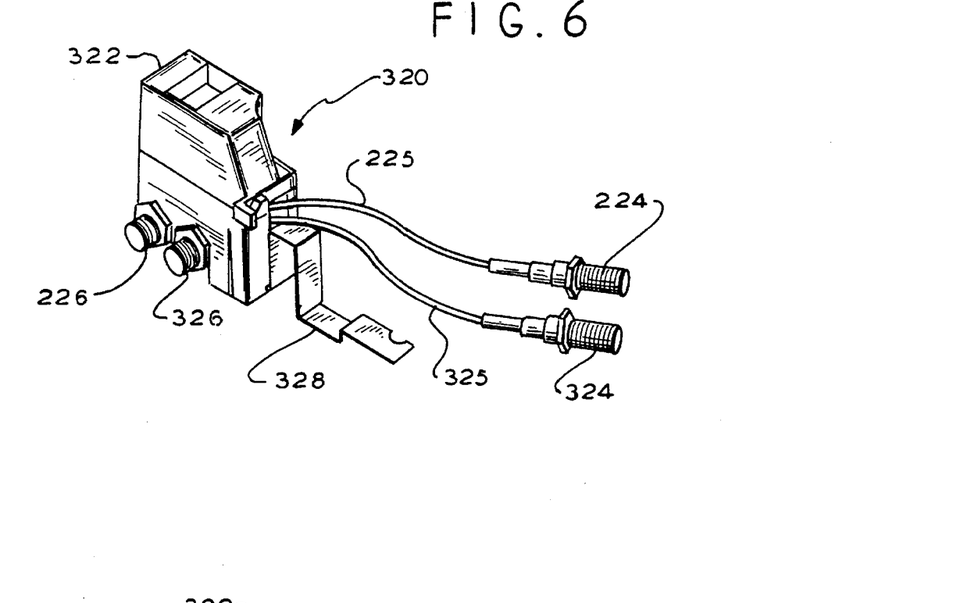
FIG. 6 is a perspective view of an alternate embodiment of a cable television module embodying the present coaxial cable module invention and which module is shown in the assembled condition.

The telephone network interface apparatus 10 of FIG. 1 comprises a housing including a base 12, a telephone company cover 14, and a subscriber cover 16. Base 12 includes a bottom 20 circumscribed by an upwardly extending wall 22 and the telephone company and subscriber covers 14 and 16 are mounted pivotally to the wall 22 as shown. The bottom 20 and wall 22 provide a compartment indicated by general numerical designation 28 and which compartment 28 is divided by the diagrammatical dividing line 33 into a telephone company compartment portion 31 and a telephone subscriber compartment portion 32. As taught in the '209 patent, the telephone company cover 14 is for being fastened only to the base 12 such as for example by a hex-headed screw, not shown, which is not easily removable by a subscriber and which requires a special type of tool not typically possessed by the subscriber but which tool is typically possessed by telephone company personnel to permit such telephone company personnel to unfasten the telephone company cover 14 from the base 12. The subscriber cover 16 is for being fastened only to the telephone company cover 14 such as for example by a screw not shown in FIG. 1. Such fastening denies the telephone customer or subscriber access to the telephone company compartment portion 31 but permits the telephone subscriber to unfasten the subscriber cover 16 from the telephone company cover 14 to gain access to the telephone subscriber compartment portion 32 which permits the telephone customer to have access to the demarcation point provided by the telephone customer's individual subscriber line module as taught in the '209 patent. Such fastening of the covers 14 and 16 also permits telephone company personnel to unfasten the telephone company cover 14 from the base 12 to thereby gain access to both the telephone company compartment 31 and the subscriber compartment 32 as is also taught in the '209 patent. A ground buss 71 is suitably mounted in the telephone company compartment 31, such as by screws not shown, and the ground buss is connected to earth ground by suitable means not shown as taught in the '209 patent. The module mounting or retaining member 11 is mounted suitably to the bottom 20 of the base 12 such as by screws not shown, and extends upwardly therefrom generally along the dividing line 33. The module mounting or retaining member 11 includes a plurality of upwardly extending flexible members 11a each provided with an outwardly extending tab 11b for being received within a notch provided on the cable television modules embodying the present invention or which tab 11b is also for extending over and wedgedly engaging a portion of the individual subscriber line module 91 as shown in FIG. 6 and described in further detail below. The module mounting or retaining member 11 may be suitably mounted to the bottom 20 of the base 12 such as by screws not shown and may be made of a suitable plastic to provide the upwardly extending members 11b with suitable flexibility and resiliency; the member 11 may be made suitably such as for example by injection molding. A plurality of upwardly extending inverted L-shaped members 110 are provided on the bottom 20. As described in detail below the members 110 cooperate with the tabs 11b in mounting the cable television module 220 to the telephone network interface apparatus 10; members 110 are the members 110 shown in cross-sectional side view in FIG. 10 of the '209 patent.

A cable television module embodiment of the coaxial cable module of the present invention is indicated by numerical designation 220 in FIG. 1 and is shown mounted to the telephone network interface apparatus 10 shown in FIG. 1. Generally, the cable television module 220 includes a housing 222, a first female coaxial cable connector 224 interconnected by a length of coaxial cable 225 to a second female coaxial cable connector 226 and a ground bracket 228; the connectors 224 and 226 are externally threaded and such connectors and the ground bracket 228 are mounted to the housing 222 in a manner described in detail below and indicated diagrammatically in FIG. 3. Further generally, it will be understood that the female coaxial cable connector 224 is for being connected to the male coaxial cable connector 230 provided on the end of the coaxial cable 232 extending partially into the telephone network interface apparatus 10 and which coaxial cable 232 is for carrying incoming cable television signals from a suitable source. The female coaxial cable connector 226 is for being connected to the male coaxial cable connector 234 provided on the end of the coaxial cable 236 extending partially into the telephone network interface apparatus 10 and which coaxial cable 236 is for being connected to a television set not shown. Upon such connections being made, the television set is connected to the incoming cable television signals.

Figure 2:
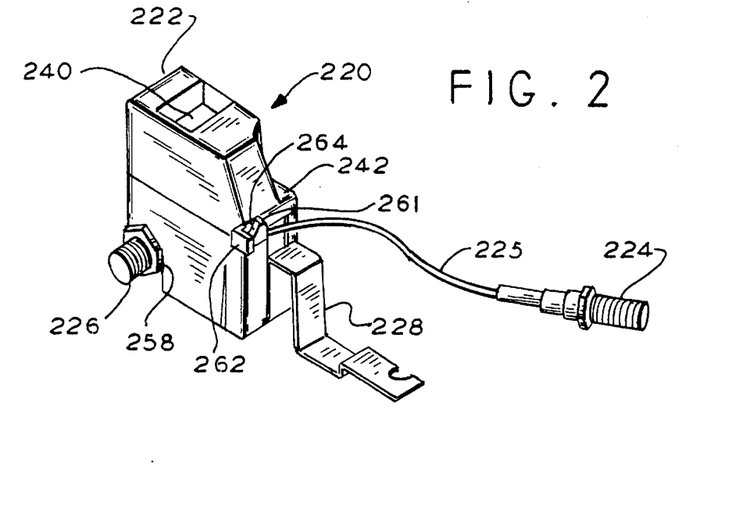
FIG. 2 is a perspective view of the cable television module of FIG. 1 shown in the assembled condition.
Figure 3:
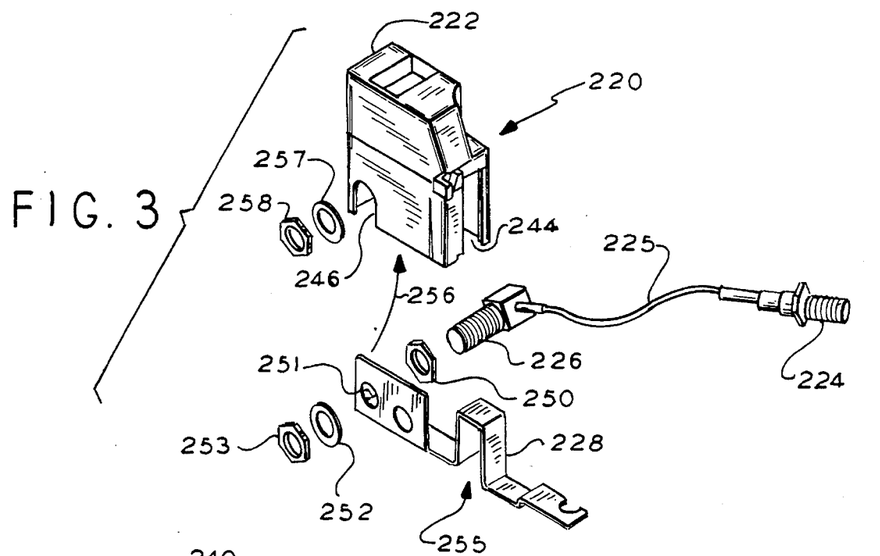
FIG. 3 is a perspective exploded view of the cable television module of FIG. 1 shown in the disassembled condition.
Figure 4:
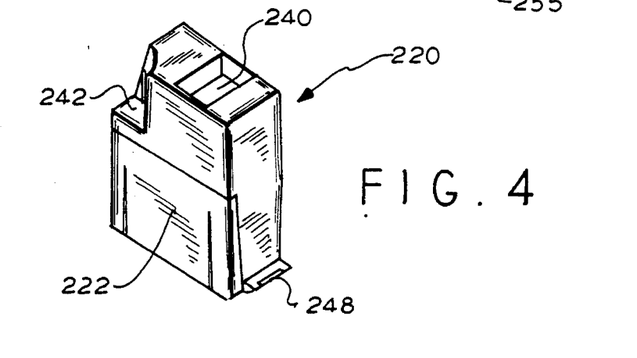
FIG. 4 is a reverse view, in perspective, of the module housing shown in FIG. 3.

Referring now to FIGS. 2–4, and first in particular to FIGS. 2 and 4, the housing 222 is provided with a first indentation 240 extending inwardly of the top portion of the housing and a second indentation 242 extending inwardly into a top corner portion of the housing. As described in detail below, the indentation 240 facilitates removal or dismounting of the cable television module 220 from the telephone network interface apparatus 10 (FIG. 1) and the indentation 242 facilitates removal or dismounting of an individual subscriber line module, such as individual subscriber line module indicated by general numerical designation 91 in FIG. 6, from the telephone network interface apparatus 10 upon such individual subscriber line module 91 being mounted laterally of and in close proximity to the cable television module 220. The housing 222, FIG. 2, may be provided with members 261 and 262 providing a notch 264 therebetween for facilitating mounting of the module 220 to the telephone network interface apparatus 10 as described below. As may be best understood by reference to FIG. 3, the female coaxial cable television connector 226 may be mounted to the ground bracket 228 by threading and tightening the internally threaded nut 250 over the externally threaded connector 226, inserting the connector 226 through the opening 251 formed in the ground bracket 238, placing the washer 252 over the connector 226 and threading and tightening the internally threaded nut 253 over the externally threaded connector 226 to provide a sub-assembly indicated by general numerical designation 255 in FIG. 3. The housing 222, as may be understood from FIG. 3, is also provided at its lower forward portion with an upwardly extending slot 244 for receiving a portion of the ground bracket 228 and is provided in its left side portion, as viewed in FIG. 3, with an upwardly extending slot 246 for receiving the connector 226. The sub-assembly 255 is inserted internally of the housing 222, as indicated by the arrow 256 in FIG. 3, with the ground bracket 228 extending outwardly of the housing 222 through the slot 244 (FIG. 3) as shown in FIG. 2 and with the female coaxial connector 226 extending outwardly through the slot 246 (FIG. 3) as shown in FIG. 2. Thereafter, the washer 257, FIG. 3, is placed over the connector 226 and the internally threaded nut 258, FIG. 3, is threaded over the connector 226, as shown in FIG. 2, and tightened to mount the sub-assembly 255 to the housing 222. It will be understood, from FIGS. 1 and 2, that the mounting of the connector 226 and ground bracket 228 to the housing 220 is in a manner such that the connector 226 and ground bracket 228 reside at least partially internally of the housing 220 and such that the connector 226 is available for being connected to the coaxial cable 236, FIG. 1, extending into the telephone network interface apparatus 10. Thus, such mounting causes the female coaxial cable connector 226 to extend out of the housing 222 sufficiently to permit the connector 226 to be connected to the male connector 234 provided on the end of the coaxial cable 236 (FIG. 1) and such mounting also causes the ground bracket 228 to extend out of the housing 222 sufficiently to permit the ground bracket to be suitably connected to the ground buss 71 in the telephone company compartment 31 to thereby connect the coaxial cable connectors 224 and 226 to earth ground.

Figure 5:
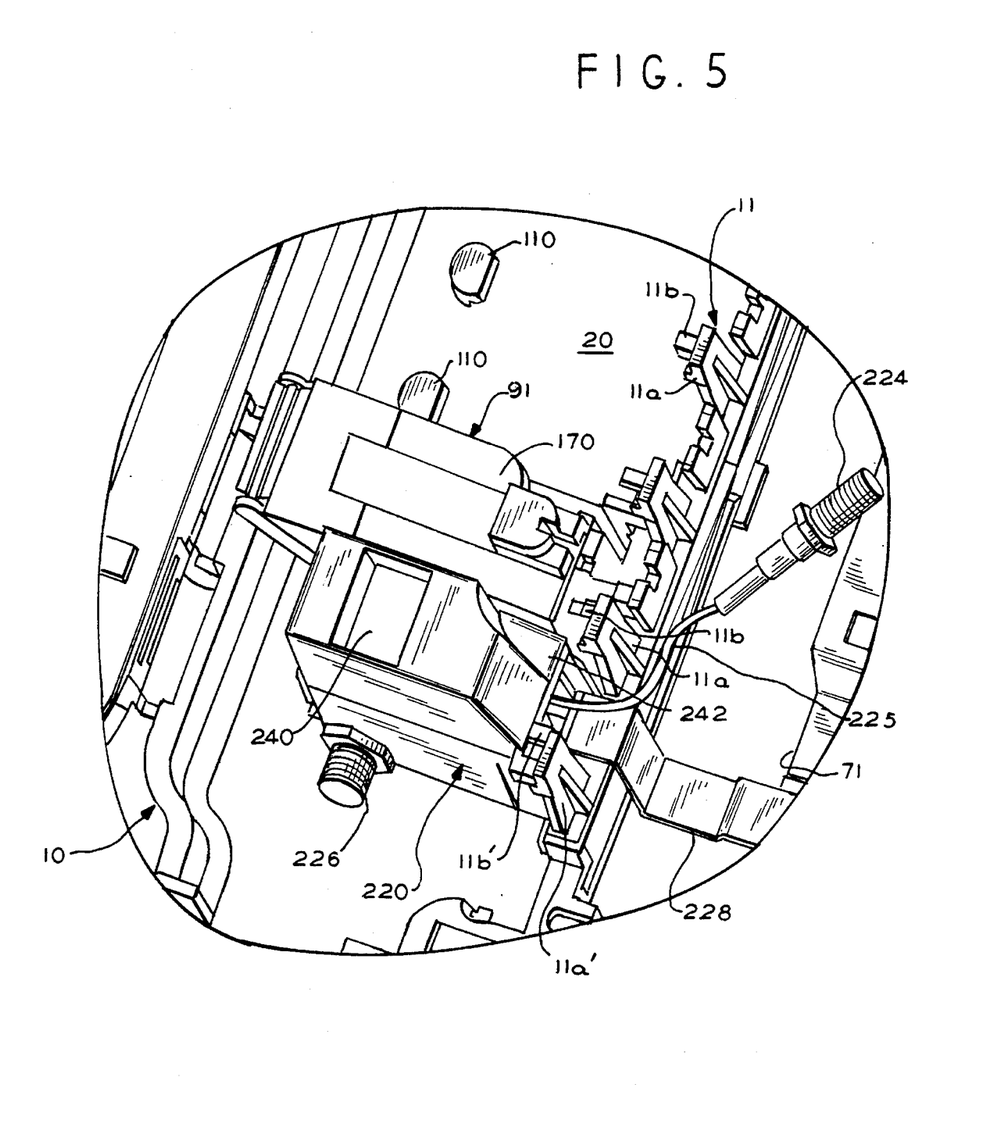
FIG. 5 is an enlarged view in perspective of a portion of FIG. 1 also showing an individual subscriber line module mounted to the telephone network interface apparatus laterally of and in close proximity to the cable television module.

Referring to FIG. 4, the lower rear portion of the housing 222 of the cable television module 220 is provided with an outwardly extending member 248, and referring now to FIG. 5, the cable television module 220 is mounted removably to the bottom 20 of the telephone network interface apparatus 10 by pivoting the cable television module 220 leftwardly as viewed in FIG. 5 and by inserting the outwardly extending member 248 under one of the upwardly extending mounting members 110, as shown in FIG. 10 of the '209 patent, by manually bending or flexing the upwardly extending member 11a' rightwardly as viewed in FIG. 5, by pivoting the cable television module 220 rightwardly to place the notch 264 (FIG. 2) under the tab 11b' after which the member 11a' is released to allow the member 11a' to pivot leftwardly as viewed in FIG. 6 to permit the tab 11b' to enter and wedgedly engage the notch 264. To remove or dismount the cable television module 220 from the telephone network interface apparatus 10, the above-described mounting procedure is reversed and it will be understood that the indentation 240 formed in the top portion of the housing 222 may receive a portion of the thumb or finger of a person to facilitate pivoting of the cable television module 220 as described above to facilitate mounting and/or dismounting of the module to and from the telephone network interface apparatus 10.

As noted above and as is shown in FIG. 5, an individual subscriber line module 91, such as individual subscriber line module 91 shown in FIGS. 12–17 of the '209 patent and described in detail therein, may be mounted laterally of and in close proximity to the cable television module 220 and it will be understood that the individual subscriber line module 91 is mounted to the apparatus 10 by inserting an outwardly extending member, such as member 114 as shown in FIG. 10 of the '209 patent under one of the upwardly extending mounting members 110 and by the tab 11b" by the member 11a" being received in a corresponding notch provided in the module 91 or by the tab 11b" extending over a portion of the top 170 of the module 91. It will be further understood that the indentation 242 formed in the corner portion of the cable television housing 220 may receive a portion of the thumb or finger of a person to facilitate grasping of the individual subscriber line module 91 to facilitate the individual subscriber line module being pivoted leftwardly as viewed in FIG. 1 to facilitate its removal or dismounting from the telephone network interface apparatus 10.

It will be understood that the telephone network interface apparatus 10, cable module 20 mounted removably to the apparatus 10, and the individual subscriber line module 91 mounted removably to the apparatus 10 comprise an embodiment of the combination apparatus of the present invention for connecting incoming telephone company wiring or lines to telephone subscriber premises wiring or lines and for connecting incoming cable television signals to a television set.

Referring again to FIG. 1 and to the demarcation points referred to above, it will be understood that upon the television set of a cable television customer not working, which customer also may be a telephone subscriber or customer, the customer may unfasten and open the subscriber cover 16 and disconnect the female coaxial cable connector 226 from the male coaxial cable connector 234 to provide a demarcation point between the customer's television set and the source of incoming cable television signals. The customer may thereafter connect a second television set, such as for example a portable television set, to the female coaxial cable connector 226 and in the event that the second television set receives a television picture and sound, the customer may reasonably determine that the failure of the first television set to receive a television picture and sound is due to the first television set not working. On the other hand, upon the customer connecting the second television set to the female coaxial cable connector 226 and upon the failure of such second television set to provide a television picture and sound, the customer may make a reasonable determination that the failure of the first television set to work is due to the failure to receive incoming coaxial cable signals. Also, a cable television repairman, which upon the Regional Bell Operating Companies being able also to provide cable television signals in addition to telephone service may be also the telephone company repairman, may open the telephone company cover 14 and disconnect the female coaxial connector 224 and the male coaxial cable connector 230 to provide a demarcation point between the customer's television set and the incoming cable television signals. Such repairman may then connect suitable cable television signal test apparatus to the male coaxial cable connector 230 and in the event that such test apparatus indicates reception of incoming coaxial cable television signals the cable television repairman may make a reasonable determination that the failure of the customer's television set to provide pictures and sound is due to the set not working. Alternatively, if such cable television signal testing apparatus does not indicate reception of incoming cable television signals a reasonable determination is made that the failure of the customer's television set to provide picture and sound is due to the failure to receive incoming cable television signals. The cable television repairman may also disconnect the female coaxial cable connector 226 and male coaxial cable connector 234 to provide a demarcation point therebetween and thereafter connect the cable television signal testing apparatus to the female coaxial cable connector 226 and make a determination, after having made the preceding described determination, as to whether or not the cable television module 220 is working or not.

Figure 7:
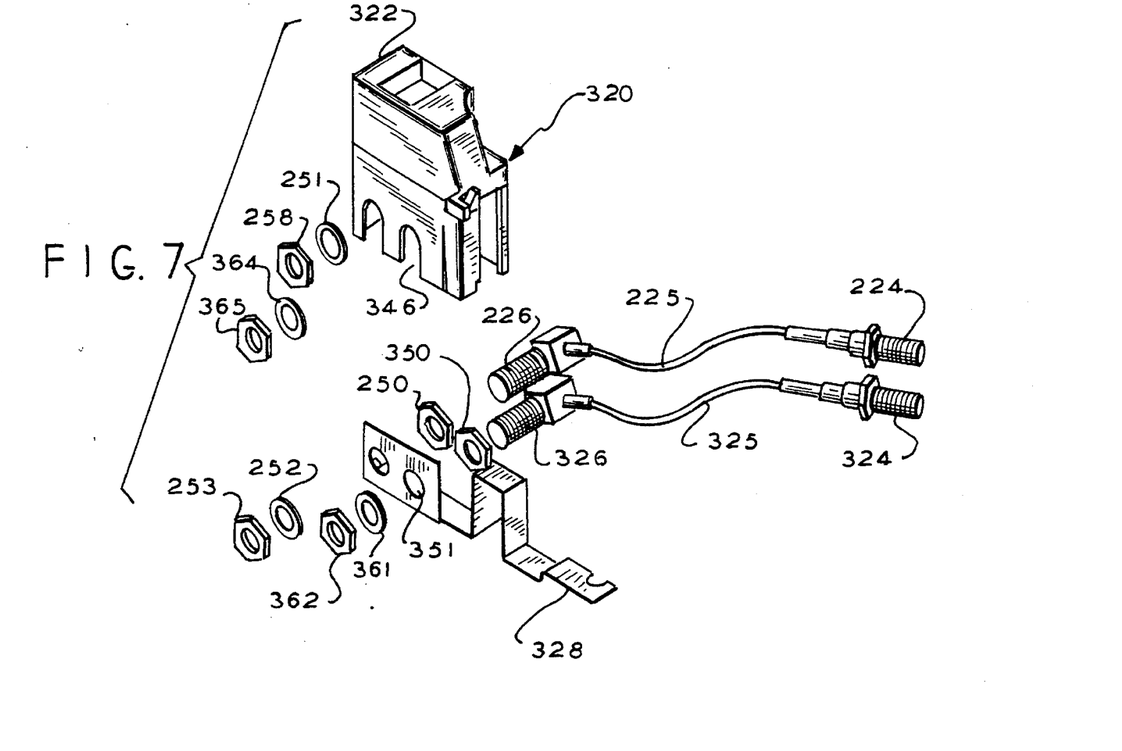
FIG. 7 is a perspective exploded view of the cable television module of FIG. 6 shown in the disassembled condition.

In the event that it is desired to connect or carry additional incoming cable television signals to the television set beyond the capacity of the coaxial cable 232 (FIG. 1) to carry cable television signals, an alternate embodiment cable television module, a further embodiment of the coaxial cable module of the present invention, may be utilized and such alternate cable television module is indicated by general numerical designation 320 in FIGS. 6 and 7. Cable television module 320 is the same as cable television module 220 except that cable television module 320 includes additional coaxial cable connectors 324 and 326 interconnected by a length of coaxial cable 325 and the housing 322 includes a second inwardly extending slot 346, FIG. 7, for receiving the connector 326, additionally the ground bracket 328 includes an opening 351 for receiving the connector 326. It will be understood that the coaxial cable connector 226 is mounted to the ground bracket 328 and to the housing 322 as described above with regard to housing 322, and it will be further understood that the coaxial cable connector 326 is mounted to the ground bracket 328 and the housing 322 by the internally threaded nuts 350, 362, and 365 and the washers 361 and 364 in the same manner that the connector 226 is mounted to the ground bracket 228 and housing 222 of FIGS. 2 and 3 as described above. It will be further understood by referring to FIG. 6 that upon such mounting the female coaxial cable 326 resides at least partially internally of the housing 322 and extends outwardly of the housing sufficiently to permit the connector 326 to be connected to a coaxial cable, not shown, which would extend into the telephone subscriber compartment 32 of FIG. 1 and which would be connected to the television set. It will be further understood by reference to FIG. 5 that the coaxial cable connector 324 is made available for connection to an additional coaxial cable, not shown, which would extend into the telephone compartment 31 of FIG. 1 and which would carry additional incoming cable television signals from a suitable source. Such connections would permit additional incoming cable television signals to be carried to the television set.

It will be further understood that the female connectors 324 and 326 of FIG. 6 may be disconnected from the male coaxial cable connectors (not shown) of the coaxial cable described above for carrying the additional incoming cable television signals and for connecting such additional incoming cable television signals to the customer's cable television set to provide demarcation points in the same manner as described above with regard to FIG. 1 and the disconnection of the female connectors 224 and 226 from the male coaxial cable connectors 230 and 234.

Referring again to FIG. 7 it will be understood that the coaxial cable connectors 226 and 326 may be commercially available F type right angle female coaxial connectors, that the coaxial cable connectors 224 and 324 may be commercially available F type in-line female coaxial cable connectors and that the lengths of coaxial cable 225 and 325 may be commercially available RG179 coaxial cable.

Figure 8:
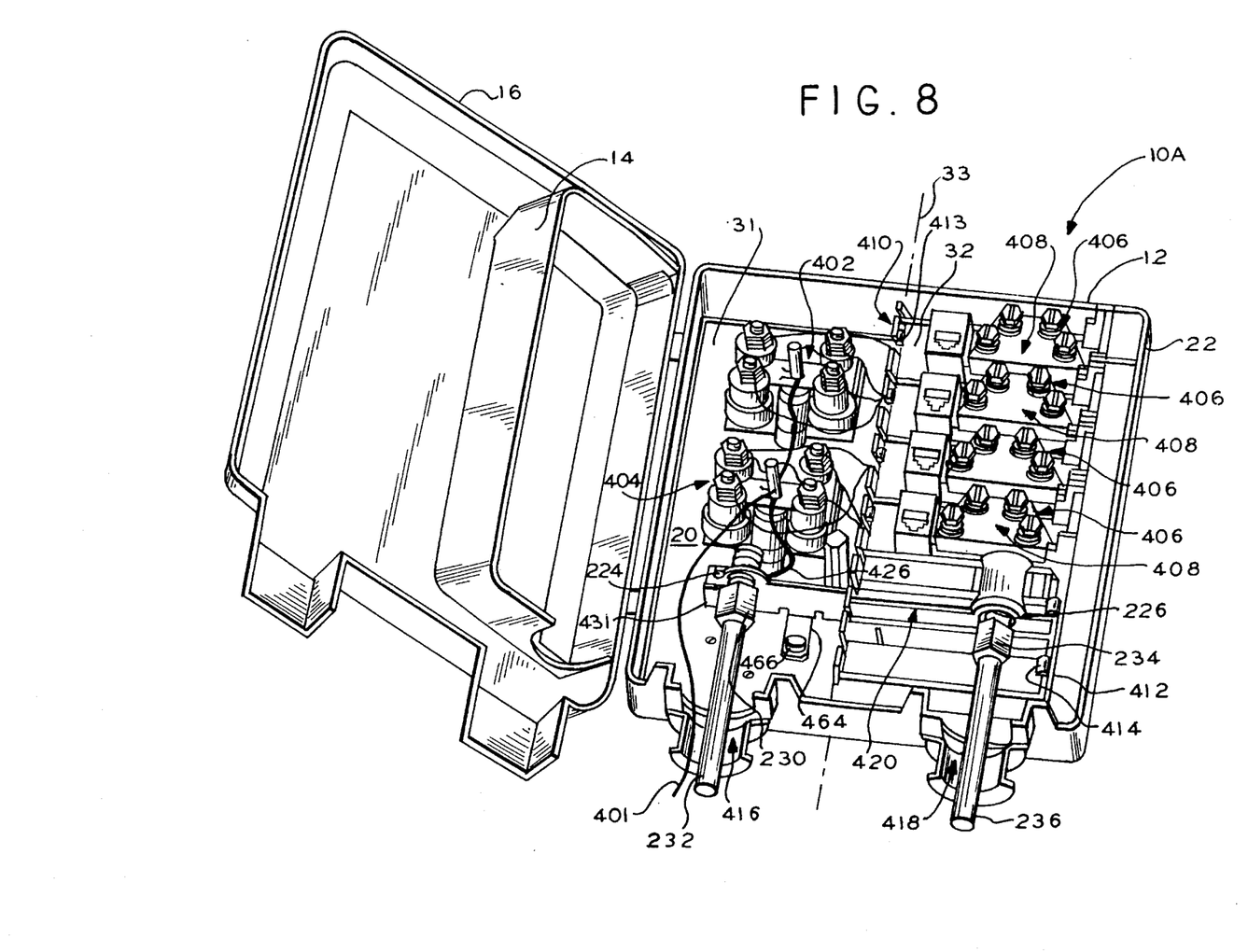
FIG. 8 is a front perspective view similar to FIG. 1 but showing an alternate embodiment of the combination telephone network interface apparatus and coaxial cable module of the present invention shown embodied as a cable television module.

Referring now to FIGS. 8–11, further embodiments of the combination telephone network interface apparatus and coaxial cable module, and coaxial cable module as a separate invention, are shown. Structural elements shown in FIGS. 8–11 which are the same as, or substantially the same as, and which have the same or substantially the same function as the structural elements shown in FIGS. 1–9 and described above, are given the same numerical designations for convenience of reference and facilitation of presentation. Telephone network interface apparatus 10A, FIG. 8, is substantially similar to telephone network interface apparatus 10 shown in FIGS. 1 and 5 but instead of including or being provided with a ground buss such as ground buss 71, FIGS. 1 and 5, apparatus 10A is provided with a ground connecting conductor or ground connecting means 401 for connecting the telephone network interface apparatus 10A to earth ground in the manner known to the art. More particularly, the ground connecting conductor 401 is connected to the protectors indicated by general numerical designations 402 and 404 in FIG. 8 which provide electrical protection to telephone subscriber lines or wiring (not shown) connected to the pairs of subscriber wiring terminals indicated by numerical designation 406 in FIG. 8; the telephone subscriber lines or wiring are connected to incoming telephone company lines (not shown) through the protectors and through the telephone jacks shown on the tops of the individual subscriber line modules and telephone plugs (not shown) in the manner known to those skilled in the art. The pairs of subscriber wiring terminals 406 are mounted on the tops of individual subscriber line modules 408 which are substantially similar to the individual subscriber line module 91 shown in FIG. 5 and described above. The individual subscriber line modules 408 are mounted removably to the bottom 20 of the telephone network interface apparatus by being wedged between a pair of upstanding mounting and retaining members indicated by general numerical designation 410 and 412 in FIG. 8. The opposite end of the individual subscriber line modules 408 are provided with outwardly extending tabs (not shown) which are wedged under outwardly extending tabs provided on the retaining members 410 and 412 such as the tab 413 provided on retaining member 410 and the tab 414 provided on the retaining member 412. Retaining member 410 extends upwardly from the telephone network interface apparatus bottom 20 generally along the dividing line 33 which generally divides the telephone compartment portion 31 from the telephone subscriber compartment portion 32. The upwardly extending retaining member 412 is disposed laterally from and generally parallel to the upwardly extending retaining member 410.

The telephone network interface apparatus 10A, referring still to FIG. 8, is provided with a first coaxial cable access opening 416 for permitting entry into the telephone network interface apparatus of the coaxial cable 232 and a second coaxial cable access opening 418 for permitting entry of the coaxial cable 236 into the telephone network interface apparatus.

Figure 9:
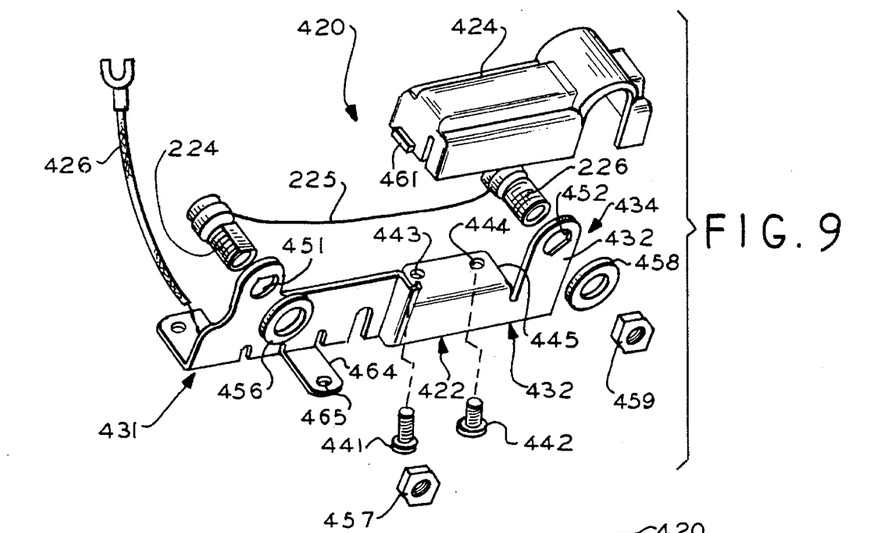
FIG. 9 is a perspective exploded view of the cable television module of FIG. 8 viewed from the bottom as oriented in FIG. 8.
Figure 10:
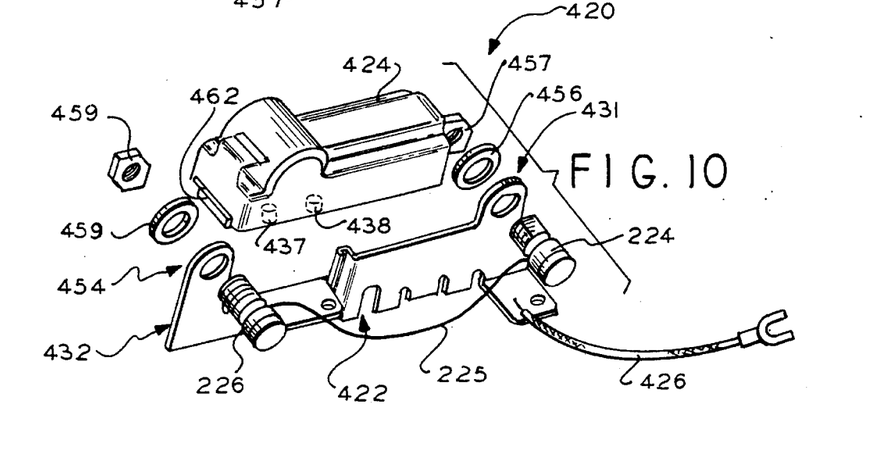
FIG. 10 is a perspective exploded view of the cable television module of FIG. 8 viewed from the top as oriented in FIG. 8.
Figure 11:
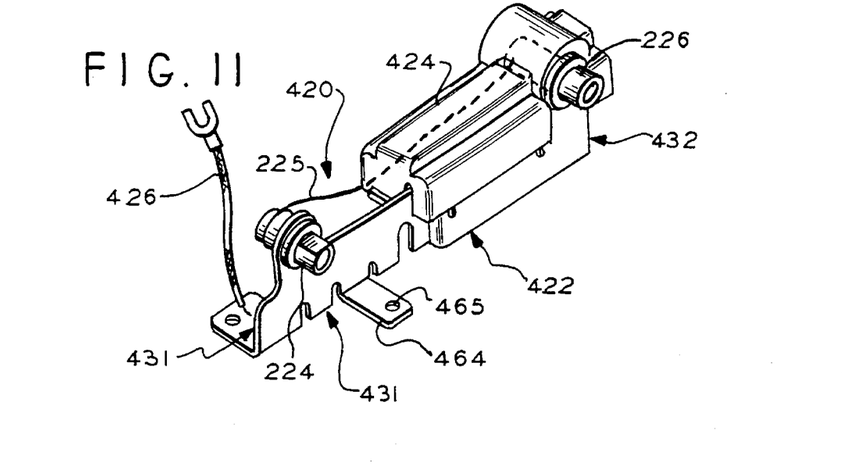
FIG. 11 is a perspective view of the cable television module of FIG. 8 shown assembled and separate from the telephone network interface apparatus of FIG. 8.

It will be generally understood that the coaxial cable module of the present invention is shown embodied in FIGS. 8–11 as a cable television module for connecting incoming cable television signals carried by the coaxial cable 232 to the coaxial cable 236 which, in the specific embodiment illustrated in FIGS. 8–11, carries the incoming cable television signals to a coaxial cable signal receiver, namely a television set (not shown). The cable television module embodiment of the coaxial cable module of the present invention is indicated by general numerical designation 420 in FIGS. 8–11. Referring to FIGS. 9–11, the module 420 includes an electrically conductive ground bracket indicated by general numerical designation 422, a pair of suitable female coaxial cable connectors 224 and 226 interconnected by coaxial cable 225, a cover 424 and a ground connecting conductor 426 for connecting the ground bracket, and the coaxial cable connectors 224 and 226 connected mechanically and electrically to the bracket as described below, to the ground conductor 401 as shown in FIG. 8 which in turn connects the ground bracket 422 and the female coaxial cable connectors 224 and 226 to earth ground. The ground bracket 422 may be made of a suitable brass and shaped as shown such as by stamping and/or machining, and the cover 420 may be made of a suitable insulating or non-conductive material such as for example a suitable plastic such as ABS, PVC, or polycarbonate.

The ground bracket 422 includes a first end portion indicated by general numerical designation 431 and a second end portion indicated by general numerical designation 432. Generally, it will be understood, that upon the module 420 being mounted to the telephone network interface apparatus 10A as shown in FIG. 8, the first ground bracket end portion 431 resides in the telephone compartment portion 31 and the second ground bracket end portion 432 resides in the telephone subscriber compartment portion 32.

The second ground bracket end portion 432 includes an upper portion indicated by general numerical designation 434 and it will be generally understood that the cover 424 is mounted to the second ground bracket end portion 432 and covers the upper portion 434 as shown in FIG. 11. The cover 424, note FIG. 10, is provided with a pair of inwardly extending holes 437 and 438 which receive a pair of threaded screws 441 and 442, FIG. 9, which are inserted upwardly through the holes 443 and 444 provided in the outwardly extending tab 445 provided on the ground bracket second end portion 432 and are screwed into the holes 437 and 438. Upon being mounted to the ground bracket second end portion 431, the cover 424 covers at least the upper portion 434 of the ground bracket second end portion 432 and, as will be understood from FIG. 8, the cover 424 prevents inadvertent or unintentional electrical contact between the pairs of subscriber wiring terminals 406 shown in FIG. 8 and the ground bracket 422.

The female coaxial cable connectors 224 and 226, FIGS. 9 and 10, are mounted respectively to the first and second ground bracket end portions 431 and 432 by being inserted through the respective openings 451 and 452 and fastened to the ground bracket 422 by the washers and threaded nuts 456 and 457 and 458 and 459; this mounts the female coaxial cable connectors 224 and 226 mechanically and electrically to the ground bracket 422.

The module 420 is mounted removably to the telephone network interface apparatus 10A, FIG. 8. The respective ends of the cover 424 are provided with outwardly extending members or tabs 461 (FIG. 9) and 462 (FIG. 10) which are wedgedly received underneath outwardly extending tabs provided respectively on the upwardly extending mounting or retaining members 410 and 412 such as outwardly extending tabs 413 and 414 shown in FIG. 8. This mounts the second end portion 432 of the module 420 to the telephone network interface apparatus bottom 420 and causes the second end portion 432 of the module 420 to reside in the telephone subscriber compartment portion 32. The first end portion 431 of the ground bracket 422 is provided with an outwardly extending tab 464, FIGS. 8, 9 and 11, which is provided with a hole 465 through which a threaded screw 466, FIG. 8, may be inserted and screwed into the bottom 20 of the telephone compartment portion 31; this mounts the first end portion 431 of the ground bracket 422 in the telephone compartment portion 431. However, it will be understood that the tabs 461 and 462 provided on opposite ends of the cover 424 may be used alone to mount the module 420 to the telephone network interface apparatus and the tab 464 may be eliminated; it has been discovered that the tabs 461 and 462 provided on the cover 424 alone are sufficient to mount the module 420 to the telephone network interface apparatus 10A.

Upon the module 420 being mounted to the telephone network interface apparatus as described, and referring to FIG. 8, it will be understood that the female coaxial cable connectors 224 and 226 are disposed generally opposite and spaced from the respective coaxial cable access openings 416 and 418. Such coaxial cable connector disposition facilitates the connection of the male coaxial cable connectors 230 and 234 provided respectively on the ends of the coaxial cables 232 and 236 to the female coaxial connectors 224 and 226 to the female coaxial connectors 224 and 226.

It will be understood (FIG. 8) that the above-noted demarcation points between the incoming cable television signals and the television set are provided, respectively, by the repairman disconnecting the male coaxial cable connector 230 from the female coaxial cable connector 224 and by the customer disconnecting the male coaxial cable connector 234 from the female coaxial cable connector 226. Thereafter, the above-noted tests for determining whether or not the television set is functioning or there is a failure to receiving the incoming cable television signals may be readily performed in the manner described above.

Further alternate embodiments of the coaxial cable module of the present invention are shown in FIGS. 12 and 13 and 14 and 15 and are indicated respectively by general numerical designations 520 and 620. In particular, modules 520 and 620 are alternative to module 420 shown in FIGS. 8–11 and described above. Accordingly, it will be understood that structural elements comprising modules 520 and 620 which are the same as the structural elements comprising module 420 are given the same numerical designations for convenience of reference. Structural elements comprising module 520 which are different from the generally corresponding elements in module 420 are given the same numerical designations plus the letter A. Similarly, structural elements comprising module 620 which generally correspond to structural elements in module 420 are given the same numerical designations plus the letter B; additional structural elements comprising module 620 are given additional numerical designations. It will be further generally understood that the cover 424A of module 520 is mounted to the ground bracket 422A (FIG. 12) and that the cover 424B of module 620 is mounted to the ground bracket 422B (FIG. 14) in the same manner that the cover 424 of module 420 is mounted to the ground bracket 422 (FIG. 9) although the mounting elements 422, 432, 437 and 438 shown in FIGS. 9 and 10 are not shown in FIGS. 12 and 14. It will be still further understood that the assembled module 520 (FIG. 13) and that the assembled module 620 (FIG. 15) are mounted to telephone network interface apparatus, such as apparatus 10A shown in FIG. 8, in the same manner that module 420 is mounted to telephone network interface apparatus 10A as shown in FIG. 8 and described above, and that modules 520 and 620 form in combination with telephone network interface apparatus, such as for example telephone network interface apparatus 10A, further combination embodiments of the present invention. Additionally, it will be understood that the ground connecting member 426 of module 520 and of module 620 are connected to the ground conductor 401 shown in FIG. 8 in the same manner that ground connecting member 426 of module 420 is connected to the ground conductor 401. Lastly it will be generally understood that the female coaxial cable connectors 424 and 426 are mounted to the ground brackets 422A and 422B in the same manner that the female coaxial cable connectors 224 and 226 are mounted to ground bracket 422 of module 420 as shown in FIGS. 9–11 and described above. These female coaxial cable connectors 224 and 226 of modules 520 and 620 are interconnected by coaxial cable 225 for the transmission of coaxial cable signals therebetween as described above with regard to the female coaxial cable connectors 224 and 226 comprising module 420.

Figure 12:
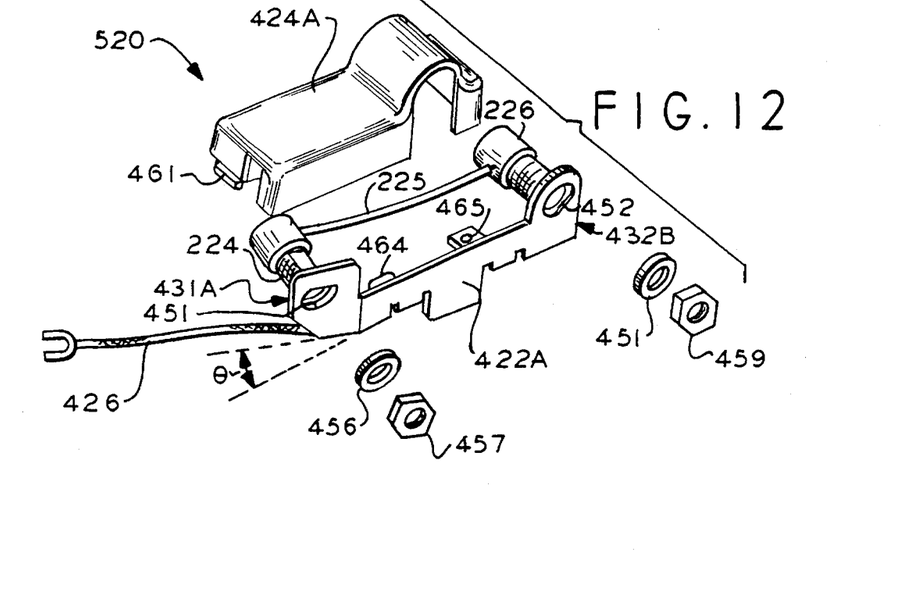
FIG. 12 is a perspective exploded view of a further alternate embodiment of the coaxial cable module of the present invention.
Figure 13:
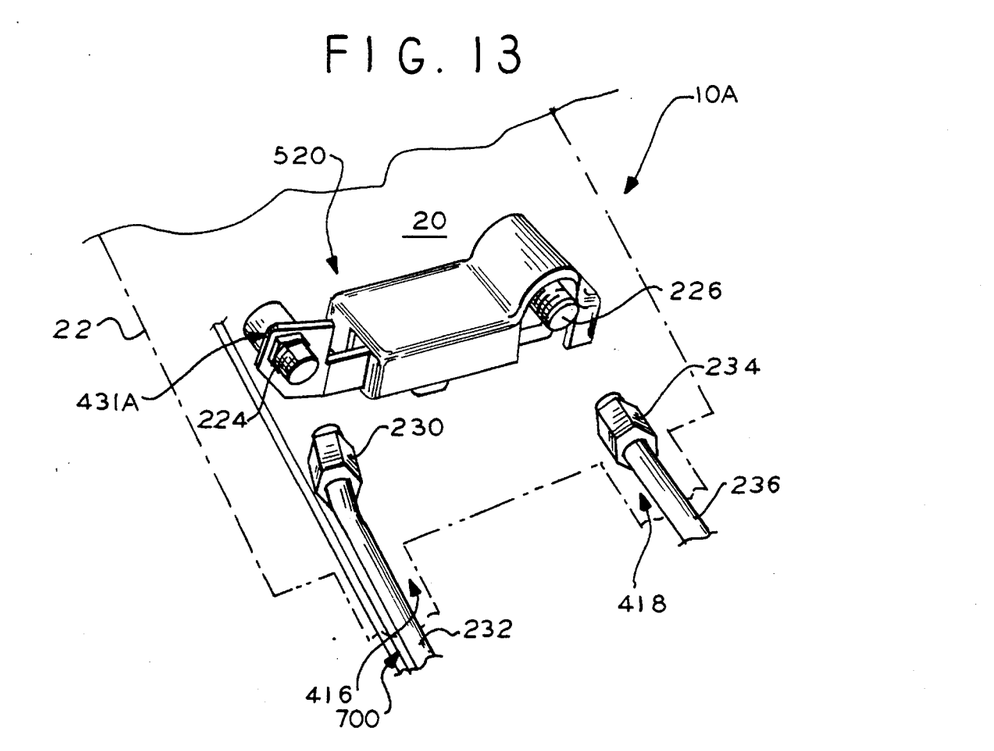
FIG. 13 shows the coaxial cable module of FIG. 8 assembled and illustrated diagrammatically as being mounted to telephone network interface apparatus partially shown in dashed outline.
Figure 14:
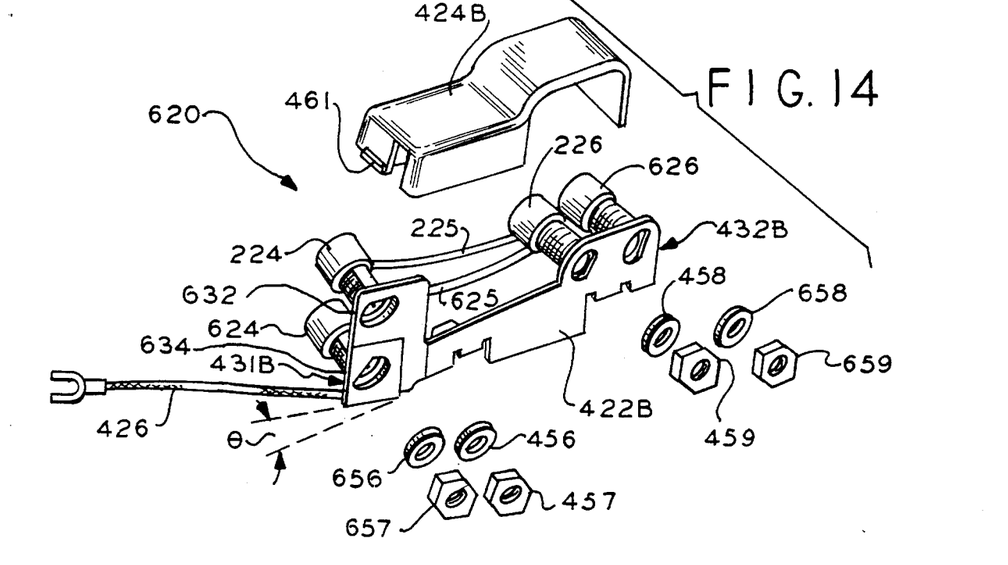
FIG. 14 is a perspective exploded view of a still further embodiment of the coaxial cable module of the present invention.
Figure 15:
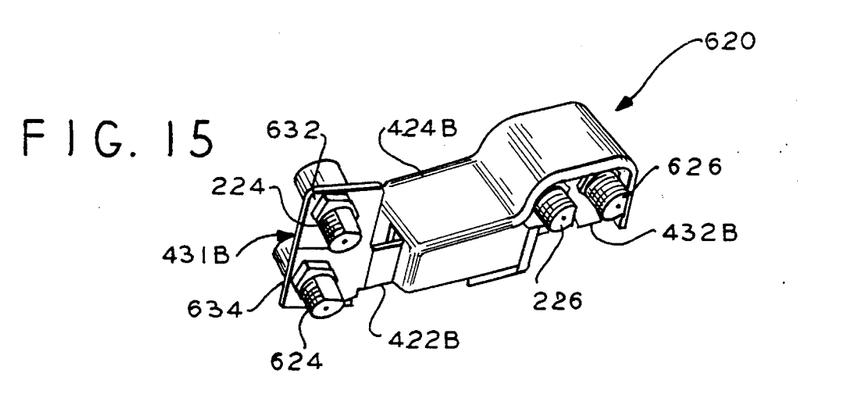
FIG. 15 is a perspective view of the coaxial cable module of FIG. 14 shown assembled.

The first end portion 431A of ground bracket 422A of module 520 (FIG. 12) and the first end portion 431B of ground bracket 422B of module 620 (FIG. 14) differ from the first end portion 431 of module 420 (FIG. 9) in that the first end portions 431A and 431B are disposed at an angle Θ with respect to the second end portions 432A and 432B of the respective ground brackets 422A and 422B, as shown in FIGS. 12 and 14. It has been found, as illustrated diagrammatically in FIG. 13 with regard to module 520 that by disposing the first bracket end portion 431A at the angle Θ with respect to the second bracket end portion 432A (FIG. 12), additional or more clearance space is provided between the end of the first bracket end portion 431A (FIG. 13) and the upwardly extending wall 22 (indicated diagrammatically in FIG. 13) comprising the base 12 of the telephone network interface apparatus 10A (FIG. 8) than would be provided between the first bracket end portion 431A and the wall 22 were the first bracket end portion 431A to be aligned linearly with the second bracket end portion 432B. This additional space facilitates the passage of the incoming telephone company line, or lines, indicated by general numerical designation 700 in FIG. 13, between the first end portion 431A of the module 520 and the telephone network interface apparatus wall 422. Such incoming telephone line or lines 700 enter the telephone network interface apparatus through the first coaxial cable access opening 416 as illustrated in FIG. 13 and are connected to the telephone terminals shown in FIG. 8 in the manner known to those skilled in the art. Referring again to FIG. 13, it has been further found that by disposing the first bracket end portion 431A at the angle Θ with respect to the second bracket end portion 432B (FIG. 12), such angular disposition of the first end portion 431A disposes the female coaxial cable connector 224 angularly with respect to the first coaxial cable access opening 416 which facilitates connection of the male coaxial cable connector 230 to the female coaxial cable connector 224. Similarly, upon the module 620 being mounted to the telephone network interface apparatus 10A, the angular disposition of the first end portion 431B of the module 620 with respect to the second end portion 432B also provides such additional space and also facilitates the passage of the incoming telephone line or lines 700 between the end portion 431B and the telephone network interface apparatus wall 22.

Referring again to FIGS. 14 and 15, module 620 includes a second pair of suitable female coaxial cable connectors 624 and 626. As shown in FIG. 14, female coaxial cable connectors 624 and 626 are interconnected by coaxial cable 625 for the transmission of coaxial cable signals therebetween. Female coaxial cable connectors 624 and 626 are mounted to ground bracket 422B by suitable washers and threaded nuts 656 and 657 and 658 and 659. It will be understood that the additional pair of coaxial cable connectors 624 and 626 connect additional coaxial cable signals from a second incoming coaxial cable (not shown) which may enter the telephone network interface apparatus 10A (FIG. 8) through the access opening 418 and to a second outgoing coaxial cable (not shown) which may enter the telephone network interface apparatus 10A through the second coaxial cable access opening 18. Thus, it will be understood that module 620 doubles the coaxial cable signal interconnecting ability of modules 420 and 520.

Figure 16:
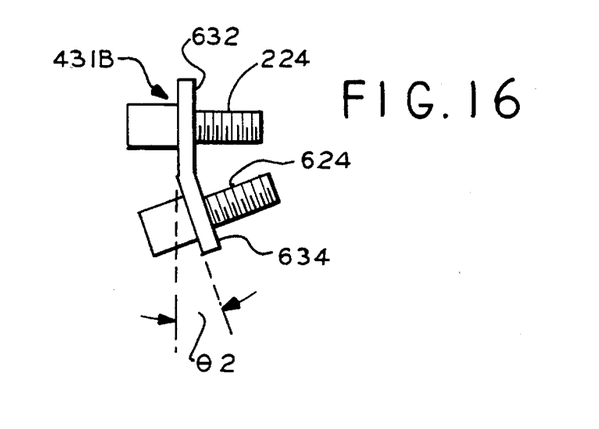
FIG. 16 is a diagrammatical left end view of the ground bracket 422B shown in FIG. 15.

Referring again to FIGS. 14–16, it will be noted and understood that the first bracket end portion 431B includes a first or upper portion 632 and a second or lower portion 634. It will be best understood from FIG. 16 that the second or lower portion 634 of the bracket first end portion 431B is disposed at an angle Θ2 with respect to the first or upper portion 632 of the first end portion 431B of the bracket 422B, in the preferred embodiment the angle Θ2 was about 3°. Such angular disposition disposes the female coaxial cable 624 (FIG. 16) at an upwardly extending angle with respect to the first coaxial cable access opening 416 (FIG. 13) upon the module 620 being mounted to the telephone network interface apparatus 10A (FIGS. 8 and 13). It has been found that such upward angular disposition of the female coaxial cable 634, FIG. 16, facilitates connection of the female coaxial cable connector 634 with the male coaxial cable connector provided on a second coaxial cable (not shown) entering the first coaxial cable access opening 416 shown in FIGS. 8 and 13.

In the preferred embodiments, modules 520 and 620 were embodied as cable television modules for interconnecting cable television signals to one or more television sets (not shown) but which television sets may be those of telephone subscribers whose subscriber lines are interconnected to incoming telephone lines through the same telephone network interface apparatus to which the modules are mounted, and in the preferred embodiments the angle Θ at which the first end portions of the brackets 422A (FIG. 12) and 422B (FIG. 14) were disposed angularly with respect to the second end portions of such brackets was about 13°. It will be further understood that coaxial cable modules 520 and 620, upon being mounted to telephone network interface apparatus, such as telephone network interface apparatus 10A shown in FIG. 8, provide the above-noted demarcation points for determining whether or not a receiver of coaxial cable signals, such as cable television signals, is faulty or whether or not such receiver is not receiving the incoming coaxial cable signals such as the noted cable television signals.

In brief summary, it will be understood that although the coaxial cable modules of the present invention is illustrated and described as being embodied as cable television modules, the coaxial cable module of the present invention may be otherwise embodied to receive the coaxial cable signals noted above and may be conveniently used to connect telephone signals, data signals, telegraph signals, video signals, and the like, from a source of such signals and a receiver of such signals.

It will be understood by those skilled in the art that many modifications and variations may be made in this invention without departing from the spirit and the scope thereof.

What is claimed is:

1. Apparatus for interconnecting incoming cable television signals to at least one television set, comprising:

cable television module means including an electrically conductive ground bracket for being mounted to telephone network interface apparatus for connecting at least one incoming telephone line to at least one telephone subscriber's line, said telephone network interface apparatus including a telephone company compartment portion, a telephone subscriber compartment portion and first ground connecting means for being connected to earth ground;

said ground bracket including a first ground bracket portion and a second ground bracket portion, upon said ground bracket being mounted to said telephone network interface apparatus, said first ground bracket portion residing in said telephone company compartment portion and said second ground bracket portion residing in said telephone subscriber compartment portion;

said module means further including at least first and second coaxial cable connector means, said first coaxial cable connector means mounted to said first ground bracket portion and for being connected to a first coaxial cable carrying the incoming cable television signals and said second coaxial cable connector means mounted to said second ground bracket portion and for being connected to a second coaxial cable for carrying the cable television signals to the television set, and interconnecting means interconnecting said first and second coaxial cable connector means to transmit the incoming cable television signals from said first coaxial cable connector means to said second coaxial cable connector means;

said module means further including second ground connecting means connected to said ground bracket and for being connected to said first ground connecting means to connect said ground bracket and said first and second coaxial cable connector means to earth ground; and mounting means for mounting said ground bracket to said telephone network interface apparatus.

2. The apparatus according to claim 1 wherein the telephone network interface apparatus includes terminal means mounted in said telephone subscriber compartment portion for being connected to the telephone subscriber's line, and wherein said module means further includes electrical insulation means mounted to and covering at least a portion of said second ground bracket portion to substantially prevent electrical contact between said terminal means and said ground bracket.

3. The apparatus according to claim 2 wherein said second ground bracket portion includes at least an upper portion and wherein said insulation means includes a cover of electrically insulative material covering said upper portion and mounted to said second ground bracket portion.

4. The apparatus according to claim 3 wherein the telephone compartment portion and the telephone subscriber compartment portion are generally separated by a dividing line, wherein the telephone network interface apparatus further includes first and second upwardly retaining members, said first retaining member generally disposed along said dividing line and said second retaining member spaced from said first retaining member and disposed generally parallel thereto and residing in said telephone subscriber compartment portion, wherein said mounting means include first and second engaging members provided on said cover for engaging said first and second retaining members to mount said module means to said telephone network interface apparatus.

5. The apparatus according to claim 4 wherein said first ground bracket portion is provided with an outwardly extending tab for receiving a threaded member to mount said first ground bracket portion in said telephone company compartment portion.

6. The apparatus according to claim 1 wherein said apparatus is for connecting the incoming cable television signals to one or more television sets, wherein said module means further comprises at least third and fourth coaxial cable connector means, said third coaxial cable connector means mounted to said first ground bracket portion and for being connected to a third coaxial cable carrying the incoming cable television signals and said fourth coaxial cable connector means mounted to said second ground bracket portion and for carrying the incoming cable television signals to at least one television sets, at least second interconnecting means interconnecting said third and fourth coaxial cable connector means to transmit the incoming television signals from the third to the fourth coaxial cable connector means.

7. The apparatus according to claim 6 wherein said first ground bracket portion is disposed horizontally at an angle with respect to said second ground bracket portion, wherein said first ground bracket portion includes first and second portions, and wherein said first coaxial cable connector means is mounted to said first portion of said first ground bracket portion and wherein said third coaxial cable connector means is mounted to said second portion of said first ground bracket portion, and wherein said second portion of said first ground bracket portion is disposed vertically at a second angle with respect to said first portion of said first ground bracket portion.

8. The apparatus according to claim 7 wherein said first angle is approximately 13° and wherein said second angle is approximately 3°.

9. The apparatus according to claim 1 wherein said first ground bracket portion is disposed horizontally at an angle with respect to said second ground bracket portion.

10. The apparatus according to claim 9 wherein said angle is approximately 13°.

11. The apparatus according to claim 1 wherein said telephone network interface apparatus includes an upstanding wall, at least one pair of telephone terminals, and is provided with first and second coaxial cable access openings for permitting entry into the telephone network interface apparatus of said first and second coaxial cables, wherein said first ground bracket portion is disposed at an angle with respect to said second ground bracket portion; wherein said at least one incoming telephone company line enters said telephone network interface apparatus through said first coaxial cable access opening, and wherein said disposition of said first ground bracket portion at an angle with respect to said second ground bracket portion facilitates passage of said at least one incoming telephone line between said first ground bracket portion and said wall for connection to said at least one pair of telephone terminals, and facilitates connection of the first coaxial cable to said first coaxial cable connector means.

12. Coaxial cable module for connecting coaxial cable signals from a source to a receiver of said coaxial cable signals, comprising:

a generally longitudinally extending, electrically conductive ground bracket including first and second end portions;

at least first and second coaxial cable connector means, said first coaxial cable connector means mounted to said first ground bracket end portion and for being connected to a first coaxial cable carrying the coaxial cable signals from the source and said second coaxial cable connector means mounted to said second ground bracket end portion and for being connected to a second coaxial cable for carrying the coaxial cable signals to the receiver;

interconnecting means interconnecting said first and second coaxial cable connectors to transmit the coaxial cable signals from said first coaxial cable connector means to said second coaxial cable connector means; and mounting means for mounting said ground bracket to support means for supporting said coaxial cable module.

13. The coaxial cable module according to claim 12 wherein said coaxial cable module further includes electrical insulation means mounted to and covering at least a portion of said second ground bracket end portion to substantially prevent electrical contact between said second ground bracket end portion and another electrically conductive member mounted to said support means.

14. The apparatus according to claim 13 wherein said second ground bracket portion includes at least an upper portion and wherein said insulation means includes a cover of electrically non-conductive material covering said upper portion and mounted to said second ground bracket portion.

15. The apparatus according to claim 12 wherein said module is for connecting coaxial cable signals from a source thereof to one or more receivers thereof, wherein said module further comprises at least third and fourth coaxial cable connector means, said third coaxial cable connector means mounted to said first ground bracket end portion and for being connected to a third coaxial cable carrying the coaxial cable signals from the source and said fourth coaxial cable connector means mounted to said second ground bracket portion and for being connected to a fourth coaxial cable for carrying the coaxial cable signals to the one or more receivers, and second interconnecting means interconnecting said third and fourth coaxial cable connectors to transmit the coaxial cable signals from said third coaxial cable connector means to said fourth coaxial cable connector means.

16. The apparatus according to claim 15 wherein said first ground bracket end portion is disposed horizontally at an angle with respect to said second ground bracket end portion, wherein said first ground bracket end portion includes first and second portions, and wherein said first coaxial cable connector means is mounted to said first portion of said first ground bracket end portion and wherein said third coaxial cable connector means is mounted to said second portion of said first ground bracket end portion, and wherein said second portion of said first ground bracket end portion is disposed vertically at a second angle with respect to said first portion of said first ground bracket end portion.

17. The apparatus according to claim 16 wherein said first angle is approximately 13° and wherein said second angle is approximately 3°.

18. The apparatus according to claim 12 wherein said first ground bracket end portion is disposed horizontally at an angle with respect to said second ground bracket end portion.

19. The apparatus according to claim 18 wherein said angle is approximately 13°.

20. Coaxial cable module for connecting coaxial cable signals from a source thereof to a receiver thereof, comprising:

a ground bracket for being connected to earth ground;

at least first and second coaxial cable connector means, one of said coaxial cable connector means mounted to and electrically connected to said ground bracket, said one of said coaxial cable connector means for being connected to a first coaxial cable carrying the coaxial cable signals from the source and the other coaxial cable connector means for being connected to a second coaxial cable for carrying the coaxial cable signals to the receiver;

interconnecting means interconnecting said first and second coaxial cable connectors to transmit the coaxial cable signals from the coaxial cable connector means connected to said first coaxial cable to the coaxial cable connector means connected to the second coaxial cable and for electrically interconnecting the other coaxial cable connector means to said one coaxial cable connector means to electrically connect said other coaxial cable connector means to said one coaxial cable connector means and thereby to said ground bracket; and mounting means for mounting said ground bracket to means for supporting said coaxial cable module.

21. The coaxial cable module according to claim 20 wherein said coaxial cable module further includes a cover of electrically insulative material covering at least a portion of said ground bracket and mounted thereto.

22. Combination apparatus for interconnecting at least one incoming telephone company line with at least one telephone subscriber line and for interconnecting incoming coaxial cable signals with a receiver of the signals, comprising:

housing means provided with ground connecting means for being connected to earth ground;

telephone connecting apparatus mounted in said housing means for interconnecting said incoming telephone company line with said telephone subscriber line, and said telephone connecting apparatus including first ground connecting means for connecting said telephone connecting apparatus to earth ground;

coaxial cable signal connecting apparatus mounted in said housing means for connecting the incoming coaxial cable signals to the receiver; and second ground connecting means for connecting said coaxial cable connecting apparatus to said first ground connecting means to connect said coaxial cable connecting apparatus to earth ground.

23. Combination apparatus for connecting at least one incoming telephone line to at least one telephone subscriber premises line and for connecting incoming coaxial cable signals to at least one receiver of the coaxial cable signals, comprising:

telephone network interface apparatus for connecting at least one incoming telephone line to the at least one telephone subscriber's line, said telephone network interface apparatus including a telephone company compartment portion, a telephone subscriber compartment portion, first ground connecting means for connecting said telephone network interface apparatus to earth ground, first coaxial cable access means for permitting at least a first coaxial cable carrying the incoming coaxial cable signals to be inserted therethrough and into said telephone company compartment portion, and second coaxial cable access means for permitting at least a second coaxial cable connected to the receiver of the coaxial cable signals to be inserted therethrough and into said telephone subscriber compartment portion to carry the coaxial cable signals to the receiver;

coaxial cable module means mounted to said telephone interface apparatus and including first and second module portions generally residing respectively in said telephone company compartment portion and said telephone subscriber compartment portion and said first and second module portions respectively disposed generally adjacent to and spaced from said first and second coaxial cable access means;

said module means further including at least first and second coaxial cable connector means mounted to said module means, said first coaxial cable connector means for being connected to said first coaxial cable and said second coaxial cable connector means for being connected to said second coaxial cable, and said module means further including interconnecting means interconnecting said first and second coaxial cable connector means to carry said incoming coaxial cable signals from said first to said second coaxial cable connector means, and second ground connecting means for being connected to said first ground connecting means to connect said first and second coaxial cable connector means to earth ground; and mounting means for mounting said module means to said telephone network interface apparatus.

24. The apparatus according to claim 23 wherein said module means includes a ground bracket and a cover, said ground bracket including first and second portions generally residing respectively in said telephone compartment portion and said telephone subscriber compartment portion, wherein said second coaxial cable connector means is mounted to said second portion of said ground bracket, and wherein said cover is mounted to said second portion of said ground bracket and resides in said telephone subscriber compartment portion.

25. The apparatus according to claim 24 wherein said first coaxial cable connecting means is mounted to said first portion of said ground bracket and reside in said telephone compartment portion.

26. The apparatus according to claim 23 wherein said apparatus is for connecting the incoming coaxial cable signals to one or more receivers of the coaxial cable signals; wherein said first coaxial cable access means is for permitting at least a third coaxial cable carrying the incoming coaxial cable signals to be inserted therethrough and into said telephone company compartment portion, wherein said second coaxial cable access means is for permitting at least a fourth coaxial cable connected to one or more of the receivers of the coaxial cable signals to be inserted therethrough and into said telephone subscriber compartment portion to carry the coaxial cable signals to the one or more receivers, wherein said module further includes at least third and fourth coaxial cable connector means mounted to said module means, said third coaxial cable connector means for being connected to said third coaxial cable and said fourth coaxial cable connector means for being connected to said fourth coaxial cable, and wherein said module means further includes second interconnecting means interconnecting said third and fourth coaxial cable connector means to carry said incoming coaxial cables from said third to said fourth coaxial cable connector.

* * * * *